(12) United States Patent
Mullay et al.

(10) Patent No.: US 7,045,580 B2
(45) Date of Patent: May 16, 2006

(54) OIL-IN-WATER EMULSIFIERS

(75) Inventors: John J. Mullay, Mentor, OH (US);
Jeffrey M. Carey, Mentor, OH (US);
James H. Bush, Mentor, OH (US);
Stuart L. Bartley, Wickliffe, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 191 days.

(21) Appl. No.: 10/689,266

(22) Filed: Oct. 20, 2003

(65) Prior Publication Data

US 2005/0084466 A1   Apr. 21, 2005

(51) Int. Cl.
*C08F 8/00* (2006.01)
(52) U.S. Cl. .................... 525/385; 525/386; 525/326.1
(58) Field of Classification Search ................ 525/385, 525/386, 326.1
See application file for complete search history.

(56) References Cited

U.S. PATENT DOCUMENTS

| | | | |
|---|---|---|---|
| 4,708,753 A | 11/1987 | Forsberg | 149/2 |
| 4,776,966 A | 10/1988 | Baker | 252/8.515 |
| 6,054,493 A | 4/2000 | Bush | 516/27 |
| 2005/0090611 A1 | 4/2005 | Huffer et al. | 524/800 |

FOREIGN PATENT DOCUMENTS

| | | |
|---|---|---|
| DE | 10147650 | 4/2003 |
| EP | 0156572 A2 | 10/1985 |
| EP | 1228118 B1 | 8/2002 |
| JP | 1995173346 A | 7/1995 |
| JP | 3401072 B2 | 4/2003 |
| WO | WO 03/029309 A2 * | 4/2003 |
| WO | WO 2005/042140 | 5/2005 |

* cited by examiner

*Primary Examiner*—Ling-Sui Choi
(74) *Attorney, Agent, or Firm*—Teresan W. Gilbert; Jason S. Fokens

(57) ABSTRACT

The invention provides an amphiphilic compound suitable for oil-in-water systems. The amphiphilic compound contains: (a) a lipophilic component that is hydrocarbon group containing about 20 or more carbon atoms; (b) a hydrophilic component selected from (i) a monomer or an oligomer of an oxyalkylene group containing 2 or more carbon atoms; (ii) a monomer or an oligomer of an oxyalkylene group containing 3 or more carbon atoms; (iii) an oligiomer containing: (1) an oxyalkylene group containing 3 or more carbon atoms; (2) an oxyalkylene group containing 2 or more carbon atoms, provided component (2) is different from component (1); (iv) a hydrocarbyl substituted hydroxyamino group; (v) a polyhydric alcohol group; and (vi) a polyamino group; and (c) a linker covalently bonding the hydrophilic component and the lipophilic component, wherein the hydrophilic component is present in an amount sufficient to at least partially disperse the amphiphilic compound in water. The invention further provides a method of preparing the amphiphilic compound.

20 Claims, No Drawings

OIL-IN-WATER EMULSIFIERS

The present invention relates to an emulsifier suitable for oil-in-water emulsions containing a lipophilic component; a hydrophilic component; and a linker. The invention further relates to the process to make the oil-in-water emulsifier and its use in industrial applications.

BACKGROUND OF THE INVENTION

Numerous types of emulsifier are known in the art and are used in many emulsion systems, such as, water-in-oil technology or oil-in-water technology and these are are disclosed in *McCutcheon's Emulsifiers and Detergents*, 1993, North American & International Edition and/or "Emulsions Theory and Practice," written by P. Becher and published by Oxford University Press, 2001. Typically, water-in-oil surfactants tend to have a low hydrophilic:lipophilic balance (hereinafter referred to as "HLB"), typically less than about 8. Conversely, oil-in-water emulsifiers tend to have higher HLB values of about 8 or more.

The lipophilic component of water-in-oil or oil-in-water emulsifiers, tends to contain less than about 20 carbon atoms or less. It is known that by increasing the length of the lipophilic component in oil-in-water emulsions to less than about 20 carbon atoms results in decreased emulsion stability.

Polyisobutylene succinimide or polyisobutylene succinic anhydride based emulsifiers are well known and are widely used in water-in-oil emulsions or lubricating oils to provide good dispersancy, stabilisation, cleansing and the like. However, due to the lipophilic nature of the polyisobutylene i.e. contains about 20 or more carbon atoms, it is difficult to use these emulsifiers in oil-in-water applications.

International publication WO 03/029309 A2 discloses a hydrophilic emulsifier based on polyisobutylene for use in oil-in-water applications. The emulsifier is made up of (a) a lipophilic part that is derived from a polyisobutylene with a molecular weight between 300 and 10,000; (b) a hydrophilic part containing a polyethylene oxide chain; and (c) a linker derived from polybasic carboxylic acid such as maleic anhydride.

European patent application EP 0 156 572 A2 discloses surfactants derived from (a) a hydrophobic component and (b) a hydrophilic component covalently bonded together. The hydrophilic component further contains an anionic group selected from phosphates, phosphonates, sulphates, sulphonates and carboxymethyl. The hydrophobic component is derived from a polymer of a mono-olefin containing 2 to 6 carbon atoms typically has a molecular weight in the range 400 to 5000. The surfactants disclosed are useful in water-in-oil or oil-in-water emulsions and are incorporated into an oil phase. However, when the surfactants are used in oil-in-water emulsions, they tolerate being dispersed in water phases which are high in dissolved inorganic matter, for example, magnesium chloride or calcium chloride.

U.S. Pat. No. 4,776,966 discloses a drilling fluid composition of an invert oil-based type emulsions that contains block or graft copolymers that are produced from polycarboxylic acids and a hydrophobic component derived from a mono-olefin and maleic anhydride. The maleic anhydride can be further reacted with compounds containing hydroxyl or amino groups, for example polyols or polyamines. However, the composition is only suitable for use in emulsions of brine-in-oil because it requires dissolved inorganic matter for emulsion stabilisation.

U.S. Pat. No. 4,708,753 discloses water-in-oil emulsions that contain as emulsifiers, mono- or diamine salts of succinic acid or monoamine salts of succinic acid half-esters or succinic acid half-amides. The half-esters or half-amides are prepared by reacting alkanolamines, polyamines, oligoalcohols or polyols with hydrocarbyl substituted succinic acid anhydrides. The hydrocarbyl contains 20 to 500 carbon atoms, for example, polyisobutylene. However, the emulsifier composition is only suitable for use in water-in-oil emulsions.

It would be desirable to have an amphiphilic compound containing a lipophilic component suitable for use in oil-in-water emulsions. The present invention provides an amphiphilic compound with a lipophilic component suitable for use in oil-in-water emulsions.

It would be desirable to have an amphiphilic compound containing a lipophilic component that is capable of dispersing in an aqueous phase. The present invention provides an amphiphilic compound containing a lipophilic component that is capable of dispersing in an aqueous phase.

It would be desirable to have an amphiphilic compound containing a hydrophilic component sufficient to provide water dispersibility or solubility to the amphiphilic compound though it contains a lipophilic component containing about 20 or more carbon atoms.

It would be desirable to have an amphiphilic compound containing a lipophilic component capable of forming a storage stable emulsion that does not require a brine stabiliser. The present invention provides an amphiphilic compound containing a lipophilic component capable of forming a storage stable emulsion that does not require a brine stabiliser.

SUMMARY OF THE INVENTION

The present invention provides an amphiphilic compound comprising:
- (a) a lipophilic component wherein the lipophilic component is a hydrocarbon group containing about 20 or more carbon atoms;
- (b) a hydrophilic component wherein the hydrophilic component is selected from at least one of the group consisting of:
  - (i) a monomer or an oligomer of an oxyalkylene group containing 2 or more carbon atoms or derivatives thereof;
  - (ii) a monomer or an oligomer of an oxyalkylene group containing 3 or more carbon atoms or derivatives thereof;
  - (iii) an oligiomer comprising:
    - (1) an oxyalkylene group containing 3 or more carbon atoms or derivatives thereof; and
    - (2) an oxyalkylene group containing 2 or more carbon atoms or derivatives thereof, provided component (2) is different from component (1);
  - (iv) a hydroxyamino group or derivatives thereof;
  - (v) a polyhydric alcohol group or derivatives thereof; and
  - (vi) a polyamino group or derivatives thereof; and
- (c) a linker covalently bonding the hydrophilic component and the lipophilic component, wherein the hydrophilic component is present in an amount sufficient to at least partially disperse the amphiphilic compound in water.

The invention further provides a process for preparing an amphiphilic compound comprising reacting:

(a) a lipophilic reactant present in the range about 6 to about 94 weight percent of the amphiphilic compound; with (b) a hydrophilic reactant present in the range about 6 to about 93.9 weight percent of the amphiphilic compound;

(c) a linker reactant covalently bonding the hydrophilic component and the lipophilic component present in the range about 0.1 to about 30 weight percent of the amphiphilic compound, wherein the lipophilic reactant contains a hydrocarbon group of about 20 or more carbon atoms; the hydrophilic reactant is selected from at least one of the group consisting of (i) a monomer or an oligomer of an oxyalkylene compound containing 2 or more carbon atoms or derivatives thereof; (ii) a monomer or an oligomer of an oxyalkylene compound containing 3 or more carbon atoms or derivatives thereof; (iii) an oligiomer comprising (1) an oxyalkylene compound containing 3 or more carbon atoms or derivatives thereof; and (2) an oxyalkylene group containing 2 or more carbon atoms or derivatives thereof, provided component (2) is different from component (1); (iv) a hydroxyamine or derivatives thereof; (v) a polyhydric alcohol or derivatives thereof; and (vi) a polyamine or derivatives thereof; and wherein the hydrophilic reactant is present in an amount sufficient to at least partially disperse the amphiphilic compound in water.

The invention further provides an amphiphilic compound suitable for use as a surfactant and/or emulsifier in oil-in-water applications.

DETAILED DESCRIPTION OF THE INVENTION

The present invention provides an amphiphilic compound comprising:

(a) a lipophilic component wherein the lipophilic component is a hydrocarbon group containing about 20 or more carbon atoms;

(b) a hydrophilic component wherein the hydrophilic component is selected from at least one of the group consisting of:

(i) a monomer or an oligomer of an oxyalkylene group containing 2 or more carbon atoms or derivatives thereof;

(ii) a monomer or an oligomer of an oxyalkylene group containing 3 or more carbon atoms or derivatives thereof;

(iii) an oligiomer comprising:

(1) an oxyalkylene group containing 3 or more carbon atoms or derivatives thereof; and (2) an oxyalkylene group containing 2 or more carbon atoms or derivatives thereof, provided component (2) is different from component (1);

(iv) a hydroxyamino group or derivatives thereof;

(v) a polyhydric alcohol or derivatives thereof; and (vi) a polyamine or derivatives thereof; and (c) a linker covalently bonding the hydrophilic component and the lipophilic component, wherein the hydrophilic component is present in an amount sufficient to at least partially disperse the amphiphilic compound in water.

The amphiphilic compound is at least partially dispersed in water. The amount of amphiphilic compound partially dispersed in the water phase is often equal to or greater than about 0.01 wt %, preferably equal to or greater than about 0.05 wt %, more preferably equal to or greater than about 0.1 wt %, even more preferably equal to or greater than about 0.3 wt %, even more preferably equal to more greater than about 0.5 wt % and most preferably equal to or greater than about 0.9 wt % of the amphiphilic compound dispersed in water at 25° C. In one embodiment the amount of the lipophilic component partially dispersed in water is in the range of about 1 wt % to about 10 wt % of the amphiphilic compound in water at 25° C.

As used herein the term "ionic strength" relates to a function expressing the effect of the charge of an ion in solution equal to the molarity of each type of ion present multiplied by the square of its charge. Therefore as ionic strength increases the ion becomes more polar. Thus the length of the lipophilic component, and/or the length of the hydrophilic component or its ionic strength, can be varied such that the amphiphilic compound is at least partially dispersed. In one embodiment the molecular weight of the lipophilic component is decreased and the hydrophilic component molecular weight is kept constant. In one embodiment the molecular weight of the hydrophilic component is increased and the lipophilic component molecular weight is kept constant. In one embodiment the molecular weight of the lipophilic component is decreased and the hydrophilic component molecular weight is increased. In one embodiment the molecular weight of the lipophilic component is decreased and the hydrophilic component molecular weight is kept constant. In one embodiment the ionic strength of the hydrophilic component is increased and the lipophilic component molecular weight is kept constant.

The amphiphilic compound often has a HLB value in the range of equal to or greater than about 8, preferably about 8 to about 100, more preferably about 8 to about 60 and most preferably about 8 to about 40. Mixtures of amphiphilic compounds may be used where the HLB value for an individual amphiphilic compound may be outside of the ranges about 8 to about 100 or about 8 to about 40, provided that the overall mixture of amphiphilic compounds is within these ranges.

Lipophilic Component

The lipophilic component (often referred to as a "tail") of the invention is a hydrocarbon group often containing about 20 or more, preferably about 25 or more, more preferably about 30 or more, even more preferably about 35 or more and most preferably about 40 or more carbon atoms. The maximum number of carbon atoms is often about 750 or less, preferably about 720 or less, more preferably about 680 or less and most preferably about 420 or less carbon atoms. Often the lipophilic component has a minimum average number molecular weight of at least about 250, preferably at least about 300, and most preferably at least about 500. Often the lipophilic component has a maximum average number molecular weight of equal to or less than about 10,000, preferably equal to or less than about 8000, more preferably equal to or less than about 5000 and most preferably equal to or less than about 3000. Examples of suitable number average molecular weight ranges include about 250 to about 10,000, preferably about 300 to about 10,000, more preferably about 450 to about 9000, even more preferably about 450 to about 6000 and most preferably about 550 to about 4750. Typically, less than about 5% by weight of the hydrocarbon group used to make the lipophilic component molecules have $\overline{M}_n$ less than about 250, more often the hydrocarbon group used to make the lipophilic component molecules have $\overline{M}_n$ of at least about 800.

The hydrocarbon group is preferably derived from a polyolefin. Examples of suitable polyolefin compounds include polyisobutylene; polypropylene; polyethylene; a copolymer derived from isobutene and butadiene; a copolymer derived from isobutene and isoprene; or mixtures thereof. Preferably the polyolefin is polyisobutylene or mixtures thereof. The lipophilic component can be used alone or in combination.

The lipophilic component is present in the range from about 6 to about 94, preferably from about 9 to about 91, even more preferably about 12 to about 88 and most preferably from about 15 to about 85 weight percent of the amphiphilic compound.

Hydrophilic Component

The hydrophilic component (often referred to as a "head") of the invention is polar and includes at least one compound selected from the group consisting of:
(i) a monomer or an oligomer of an oxyalkylene group containing 2 or more carbon atoms or derivatives thereof;
(ii) a monomer or an oligomer of an oxyalkylene group containing 3 or more carbon atoms or derivatives thereof;
(iii) an oligiomer comprising:
(1) an oxyalkylene group containing 3 or more carbon atoms or derivatives thereof; and
(2) an oxyalkylene group containing 2 or more carbon atoms or derivatives thereof, provided component (2) is different from component (1);
(iv) a hydroxyamino group or derivatives thereof;
(v) a polyhydric alcohol group or derivatives thereof; and
(vi) a polyamino group or derivatives thereof.

Component (i) of the hydrophilic component contains an oxyalkylene group derivative often derived from an alkylene oxide containing 2 or more carbon atoms and typically containing less than about 7 and preferably less than about 5 carbon atoms. Suitable examples of an alkylene oxide containing 2 or more carbon atoms include derivatives of ethylene oxide, propylene oxide, butylene oxide, pentylene oxide or mixtures thereof. Preferably the oxyalkylene group containing 2 or more carbon atoms is a derivative of ethylene oxide or mixtures thereof. Typically the oxyalkylene group containing 2 or more carbon atoms has a number of repeat units present from about 1 to about 60, preferably about 2 to about 45, more preferably about 4 to about 35 and most preferably about 6 to about 30.

Component (ii) of the hydrophilic component contains an oxyalkylene group containing 3 or more carbon atoms and typically containing less than about 7 and preferably less than about 5 carbon atoms. Suitable examples of an oxyalkylene group containing 3 or more carbon atoms include derivatives of propylene oxide, butylene oxide, pentylene oxide or mixtures thereof. Preferably the oxyalkylene group containing 3 or more carbon atoms includes derivatives of propylene oxide or mixtures thereof. Typically the oxyalkylene group containing 3 or more carbon atoms has a number of repeat units present from about 1 to about 60, preferably about 2 to about 45, more preferably about 4 to about 35 and most preferably about 6 to about 30.

Component (iii) of the hydrophilic component contains an oligomer comprising: (1) an oxyalkylene group containing 3 or more carbon atoms; (2) oxyalkylene group containing 2 or more carbon atoms, provided component (2) is different from component (1). Component (1) is defined the same as an oxyalkylene group containing 3 or more carbon atoms discussed above. Component (2) is defined the same as an oxyalkylene group containing 2 or more carbon atoms discussed above. The difference in the number of carbon atoms present in component (1) and component (2) is often up to 5, preferably up to 3 and most preferably 1 carbon atom.

Examples of suitable oligomers of component (1) and component (2) include oligomers of ethylene oxide-propylene oxide, ethylene oxide-butylene oxide, ethylene oxide-pentylene oxide, ethylene oxide-heptylene oxide, propylene oxide-butylene oxide, propylene oxide-pentylene oxide, propylene oxide-heptylene oxide or mixtures thereof. Preferably the oligomer of component (1) and component (2) includes ethylene oxide-propylene oxide, ethylene oxide-butylene oxide, ethylene oxide-pentylene oxide or mixtures thereof. Preferably the oligomer of component (1) and component (2) is ethylene oxide-propylene oxide or mixtures thereof.

Component (iv) of the hydrophilic component is the hydroxyamino group. Often the hydroxyamino group contains 1 to about 10, preferably 1 to about 8, more preferably about 2 to about 6 and most preferably about 2 to about 6 hydroxy groups.

The hydroxyamino group often contains 1 to about 8, more preferably 1 to about 4 and most preferably 1 to about 2 amino groups. The amine includes primary, secondary or tertiary although secondary or tertiary are preferred.

The hydrocarbyl substituted hydroxyamine often contains 1 to about 30, preferably about 2 to about 20 and more preferably about 2 to about 10 carbon atoms. In one embodiment the hydrocarbyl substituted hydroxyamine contains 4 or more carbon atoms and 2 or more hydroxy groups.

The hydroxyamino group is often derived from a hydroxylamine. Suitable examples of a hydroxyamine include ethanolamine, isopropanolamine, diethanolamine, triethanolamine, diethylethanolamine, dimethylethanolamine, dibutylethanolamine, 3-amino-1,2-propanediol; serinol; 2-amino-2-methyl-1,3-propanediol; tris(hydroxymethyl)-aminomethane; N-methylglucamine, 1-amino-1-deoxy-D-sorbitol; diethanol amine; diisopropanolamine; N-methyl-N,N-diethanol amine; triethanolamine; N,N,N', N'-tetrakis(2-hydroxypropyl)-ethylenediamine, 2-amino-2-methyl-1-propanol, 2-dimethylamino-methyl-1-propanediol, 2-amino-2-ethyl-1,3-propanediol, 2-amino-2-methyl-1,3-propanediol, 2-amino-1-butanol and mixtures thereof. Preferably the hydroxyamine is N-methylglucamine or mixtures thereof.

Component (v) of the hydrophilic component is derived from a polyhydric alcohol (also often referred to as a polyol). The polyhydric alcohol is selected from the group consisting of a glycol, non-glycol and mixtures thereof. The polyhydric alcohol is often aliphatic, cycloaliphatic, aromatic, or heterocyclic. The polyhydric alcohol is selected from the group consisting of aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, heterocyclic-substituted aromatic alcohols and mixtures thereof.

The polyhydric alcohol contains about 2 to about 10 and preferably about 2 to about 6 hydroxy groups. Typically a non-glycol polyhydric alcohol contains not more than about 40, preferably not more than about 20 and most preferably about 3 to about 15 carbon atoms. Alcohols derived from glycol contain up to about 150 oxyalkylene group groups and the oxyalkylene group radical contains about 2 to about 8 and more preferably about 2 to about 5 carbon atoms.

When the polyhydric alcohol is a glycol, suitable examples of glycols include ethylene glycol, propylene glycol, butylene glycol, pentaerthyritol, mannitol, sorbitol, glycerol, di-glycerol, tri-glycerol, tetra-glycerol, erythritol, 2-hydroxymethyl-2-methyl-1,3-propanediol (trimethylolethane), 2-ethyl-2-(hydroxymethyl)-1,3-propanediol (trimethylolpropane), 1,2,4-hexanetriol and mixtures thereof.

When the polyhydric alcohol is a non-glycol, suitable examples include dihydroxypropanes, dihydroxybutanes, dihydroxypentanes, glycerine, trihydroxypropanes, trihydroxybutanes, trihydroxypentanes, glycerol, erythritol, 2-hydroxymethyl-2-methyl-1,3-propanediol (trimethylolethane), 2-ethyl-2-(hydroxymethyl)-1,3-propanediol (trimethylolpropane), 1,2,4-hexanetriol and mixtures thereof.

Component (vi) of the hydrophilic component is derived from a polyamine. The polyamine may be linear or branched and are selected from the group consisting of alkylenepolyamines, cycloaliphatic polyamines, heterocyclic polyamines and mixtures thereof.

In one embodiment the alkylenepolyamines are selected from the group consisting of ethylenepolyamines, propylenepolyamines, butylenepolyamines and mixtures thereof. Examples of propylenepolyamines include propylenediamine, dipropylenetriamine or mixtures thereof. Ethylenepolyamines are preferred and specific examples include ethylenediamine, diethylenetriamine, triethylenetetramine, tetraethylenepentamine, pentaethylenehexamine, polyamine still bottoms, heavy amines such as HPA-X™ from Union Carbide, E-100™ from Dow and mixtures thereof.

In one embodiment the polyamines are α,β-diaminoalkanes. Suitable α,β-diaminoalkanes include diaminopropanes, diaminobutanes or mixtures thereof. Specific diaminoalkanes are selected from the group consisting of N-(2-aminoethyl)-1,3-propane diamine, 3,3'-diamine-N-methyldipropylamine, tris(2-aminoethyl)amine, N,N-bis(3-aminopropyl)-1,3-propane diamine, N,N'-1,2-ethanediylbis-(1,3-propane diamine) and mixtures thereof.

The invention includes derivatives of the hydrophilic component. Often the derivatives include another polar moiety. Suitable examples of the polar moiety are selected from the group consisting of an alcohol, a non-ionic amine, a cationic primary amine, a cationic secondary amine, a cationic tertiary amine, a quaternary amine, an amide, an imide, an alkanolamide, a sarcosinate, a sulphosuccinate, a taurate, a sulphonate, a sulphate, an amine oxide, a poly (oxyalkylene) compound including block copolymers comprising alkylene oxide repeat units (e.g., Pluronic™); a bis(2-aminopropyl)ether-Ethylene oxide-propylene oxide copolymer (commercially sold as Jeffamine ED 2003™ (or XTJ-502™), Jeffamine M-1000™ (or XTL-506™)), an ethoxylate such as an ethoxylated alcohol; an ethoxylated amine; an ethoxylated amide; an ethoxylated fatty acid; an ethoxylated acid; an ethoxylated phenol; an ethoxylated ester, a ketone, a carboxylate, an aldehyde, a glycerol ester, an ester, a 2-acrylomidomethylpropane sulphonic acid, a 2-methacrylomidomethylpropane sulphonic acid, an imidazoline, a phosphate, a phosphonate, a borate, a borane, a silicate, a monoglyceride, a diglyceride, a phosphate ester, a propoxylated acid, a sorbitan, a sucrose ester, a carboxylate salt, a halide, an oxygenated halide, a nitrate, a nitrite, a nitroso compound, a nitramine, a nitro compound, a sulphide, a sulphite, a thiol, an oxygenated sulphur, an azide and mixtures thereof.

Preferably the polar moiety is selected from the group consisting of a non-ionic amine, a cationic primary amine, a N-methylglucamine, a poly(oxyalkylene) compound, a 2-acrylomidomethylpropane sulphonic acid, a 2-methacrylomido-methylpropane sulphonic acid, a sulphonate, a sulphate, an ethoxylate, a bis( 2-aminopropyl)ether-Ethylene oxide-propylene oxide copolymer, a phosphate, a carboxylate and mixtures thereof.

When the polar moiety requires an ammonium or metal counter ion suitable examples of the metal include lithium, sodium, potassium, magnesium, calcium or mixtures thereof. Preferably the metal counter ion is sodium or mixtures thereof.

The hydrophilic component is present in the range from about 6 to about 93.9, preferably from about 9 to about 90.9, even more preferably about 12 to about 87.9 and most preferably from about 15 to about 84.9 weight percent of the amphiphilic compound. The hydrophilic component can be used alone or in combination.

Linker

The invention further contains the linker covalently bonding the hydrophilic component and a lipophilic component. In one embodiment of the invention the linker is a covalent bond directly between the hydrophilic component and the lipophilic component such as C-Q, wherein C is a carbon atom and Q is C, N, O, P or S, preferably with C derived from the lipophilic component and Q derived from the hydrophilic component. When Q is C, the linker is a C—C bond that is saturated or unsaturated.

In one embodiment of the invention the linker is derived from an alpha-beta olefinically unsaturated carboxylic acid or reactive equivalents thereof and may be either monobasic or polybasic in nature. Monobasic carboxylic acids include those represented by the formula:

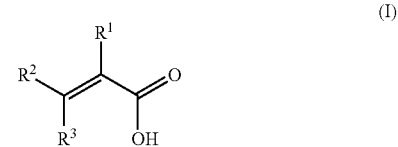

(I)

wherein $R^1$ is hydrogen or hydrocarbyl containing 1 to 20, preferably 1 to 10, more preferably 1 to 5 and most preferably 1 to 2 carbon atoms; and $R^2$ and $R^3$ can be the same or different and are independently hydrogen or alkyl with 1 to 6, preferably 1 to 4 and most preferably 1 to 2 carbon atoms. Preferably at least one of $R^2$ and $R^3$ are hydrogen and most preferably both $R^2$ and $R^3$ are hydrogen.

Monobasic carboxylic acids include (meth)acrylic acid, cinnamic acid, crotonic acid, 3-phenylpropenoic acid, α,β-decenoic acid, glyoxylic acid and mixtures thereof. (The expression "(meth)acrylic" is intended to encompass both acrylic and methacrylic.)

Polybasic carboxylic acids are preferably dicarboxylic, although tri- and tetra-carboxylic acids can be used. Examples of suitable polybasic acids include maleic acid, fumaric acid, mesaconic acid, itaconic acid, citraconic acid or mixtures thereof.

Reactive equivalents of monobasic or polybasic carboxylic acids include anhydrides, hemiacetals, esters, acylated nitrogen, acyl halide, nitriles, metal salts or mixtures thereof. Among these, anhydrides, particularly of diacids, are preferred. In one embodiment the derivative of a dibasic carboxylic acid is maleic anhydride. The derivative of a dibasic carboxylic acid is selected from the group consisting of an imide, an amide, a half amide, an ester, a half ester, a metal salt, a half metal salt and mixtures thereof.

In one embodiment of the invention the linker is an alkyl phenol or derivatives thereof and represented by the formula:

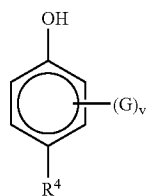

(II)

wherein $R^4$ is the lipophilic component and G is a hydrocarbyl group or mixtures thereof. When present G can be located at all positions or independently positions 2-, 3-, 5- or 6-relative to the hydroxyl group, although positions 2- or 6- are preferred. v is an integer with a value of 0, 1 2, 3 or 4, preferably v has a value of 0, 1 or 2 and most preferably 1. In one embodiment v is 0 and in another embodiment v is 1.

In one embodiment the linker is derived from known detergents that include a phenate, a sulphonate, a saligenin, a salixarate or mixtures thereof. The detergents can be non-overbased or overbased. The phenate can contain a bridging group or be unbridged. Bridging groups include a sulphur atom or a number of sulphur atoms bonded together, an alkylene group, especially methylene coupled or mixtures thereof.

In one embodiment of the invention the linker is represented by 1,2,4-triazoles or benzotriazoles, benzimidazoles, 2-alkyldithiobenzimidazoles, 2-(N,N-dialkyldithiocarbamoyl)benzothiazoles, 2,5-bis(alkyl-dithio)-1,3,4-thiadiazoles, 2,5-bis(N,N-dialkyldithiocarbamoyl)-1,3,4-thiadiazoles, 2-alkyldithio-5-mercapto thiadiazoles, 2-alkyldithiobenzothiazoles, or mixtures thereof. In one embodiment the linker is a derivative of 1,2,4-triazole or mixtures thereof. In one embodiment the optional linker is a derivative of benzotriazole or mixtures thereof. In one embodiment the optional linker is a 2,5-bis(alkyl-dithio)-1,3,4-thiadiazole or mixtures thereof.

Examples of suitable benzotriazoles include 4-methyl benzotriazole, 5-methyl benzotriazole, 4-ethyl benzotriazole, 5-ethyl benzotriazole, 4-propyl benzotriazole, 5-propyl benzotriazole N,N-bis(heptyl)-ar-methyl-1H-benzotriazole-1-methanamine, N,N-bis(nonyl)-ar-methyl-1H-benzotriazole-1-methanamine, N,N-bis(decyl)-ar-methyl-1H-benzotriazole-1-methanamine, N,N-bis(undecyl)-ar-methyl-1H-benzotriazole-1-methanamine, N,N-bis(dodecyl)-ar-methyl-1H-benzotriazole-1-methanamine N,N-bis(2-ethylhexyl)-ar-methyl-1H-benzotriazole-1-methanamine and mixtures thereof. Preferably examples of suitable benzotriazoles are selected from the group consisting of 4-methyl benzotriazole, 5-methyl benzotriazole and mixtures thereof.

Examples of suitable 2,5-bis(alkyl-dithio)-1,3,4-thiadiazoles include 2,5-bis(tert-octyldithio)-1,3,4-thiadiazole 2,5-bis(tert-nonyldithio)-1,3,4-thiadiazole, 2,5-bis(tert-decyldithio)-1,3,4-thiadiazole, 2,5-bis(tert-undecyldithio)-1,3,4-thiadiazole, 2,5-bis(tert-dodecyldithio)-1,3,4-thiadiazole, 2,5-bis(tert-tridecyldithio)-1,3,4-thiadiazole, 2,5-bis(tert-tetradecyldithio)-1,3,4-thiadiazole, 2,5-bis(tert-pentadecyldithio)- 1,3,4-thiadiazole, 2,5-bis(tert-hexadecyldithio)-1,3,4-thiadiazole, 2,5-bis(tert-heptadecyldithio)-1,3,4-thiadiazole, 2,5-bis(tert-octadecyldithio)-1,3,4-thiadiazole, 2,5-bis(tert-nonadecyldithio)-1,3,4-thiadiazole, 2,5-bis(tert-eicosyldithio)-1,3,4-thiadiazole and mixtures thereof. Preferably examples of suitable 2,5-bis(alkyl-dithio)-1,3,4-thiadiazoles include 2,5-bis(tert-nonyldithio)-1,3,4-thiadiazole or mixtures thereof.

The linker is present in the range from about 0.1 to about 30, preferably from about 0.1 to about 25, even more preferably about 0.1 to about 20 and most preferably from about 0.1 to about 15 weight percent of the amphiphilic compound.

Process

The invention further provides a process for preparing an amphiphilic compound comprising reacting:
(a) a lipophilic reactant present in the range about 6 to about 94 weight percent of the amphiphilic compound; with
(b) a hydrophilic reactant present in the range about 6 to about 93.9 weight percent of the amphiphilic compound;
(c) a linker reactant covalently bonding the hydrophilic component and the lipophilic component present in the range about 0.1 to about 30 weight percent of the amphiphilic compound, wherein the lipophilic reactant contains a hydrocarbon group of about 20 or more carbon atoms; the hydrophilic reactant is selected from at least one of the group consisting of (i) a monomer or an oligomer of an oxyalkylene compound containing 2 or more carbon atoms or derivatives thereof; (ii) a monomer or an oligomer of an oxyalkylene compound containing 3 or more carbon atoms or derivatives thereof; (iii) an oligiomer comprising (1) an oxyalkylene compound containing 3 or more carbon atoms or derivatives thereof; and (2) an oxyalkylene group containing 2 or more carbon atoms or derivatives thereof, provided component (2) is different from component (1); (iv) a hydroxyamine or derivatives thereof; (v) a polyhydric alcohol or derivatives thereof; and (vi) a polyamine or derivatives thereof; and wherein the hydrophilic reactant is present in an amount sufficient to at least partially disperse the amphiphilic compound in water.

The amphiphilic compound of the invention contains a lipophilic component, a hydrophilic component and a linker derived from a lipophilic reactant, a hydrophilic reactant and a linker reactant respectively.

Reactants (a), (b) and (c) are often added in a single portion, a multiple portion or mixtures thereof. Preferably reactants (a) and (c) are added in a single portion; and reactant (b) is added in multiple portions. A multiple portion involves about 2 or more additions, preferably about three or more additions and most preferably about four or more portions. Each portion is of approximately the same weight, different weight or mixtures thereof. Preferably when more than one portion is added each portion is approximately the same weight.

Optionally the process further includes the adding a solvent before or during reacting (a), (b) and (c), although preferably the solvent is added before. Examples of suitable solvents include toluene or xylene, a mineral oil, water, a $C_1$–$C_{20}$ monohydric alcohol, a $C_1$–$C_{20}$ dihydric alcohol, a $C_1$–$C_{20}$ trihydric alcohol, a carboxylic acid ester such as ethyl acetate, an ether or mixtures thereof. Alternatively the solvent comprises a $C_1$–$C_4$ monohydric alcohol such as methanol in combination with a hydrocarbon solvent or a mineral oil. Preferably the solvent is toluene or mixtures thereof.

The temperatures for reacting reactants (a), (b) and (c) are in the range of about 25° C. to about 250° C., preferably about 35° C. to 200° C. and most preferably about 40° C. to about 175° C. In one embodiment the temperature range is about 45° C. to about 65° C. In one embodiment the temperature range is about 120° C. to about 150° C.

The temperatures for reacting reactants (a), (b) and (c) are held for a period of time in the range of about 30 seconds to about 24 hours, preferably about 1 minute to about 20 hours, and most preferably about 2 minutes to about 15 hours. In one embodiment the mixture is held for about 5 minutes. In one embodiment the mixture is held for about 7 minutes. In one embodiment the mixture is held for about 10 minutes. In one embodiment the mixture is held for about 15 minutes. In one embodiment the mixture is held for about 20 minutes. In one embodiment the mixture is held for about 30 minutes. In one embodiment the mixture is held for about 1.5 hours. In one embodiment the mixture is held for about 5 hours. In one embodiment the mixture is held for about 7 hours.

The pressures used for reacting reactants (a), (b) and (c) are in the range of about 93.3 kPa to about 266.7 kPa (about 700 mm of Hg to about 2000 mm of Hg), preferably about 100 kPa to about 133.3 kPa (about 750 mm of Hg to about 1000 mm of Hg), and most preferably about 103 kPa to about 120 kPa (about 775 mm of Hg to about 900 mm of Hg).

Optionally the process further includes drying the amphiphilic compound formed by reacting (a), (b) and (c), preferably in a vacuum and more preferably a vacuum oven.

When present, the vacuum oven often has pressures in the range of about 7 kPa to about 102 kPa (about 50 mm of Hg to about 765 mm of Hg), preferably about 13 kPa to about 96 kPa (about 100 mm of Hg to about 720 mm of Hg), and most preferably about 28 kPa to about 92 kPa (about 210 mm of Hg to about 690 mm of Hg). The vacuum oven often has a temperature in the range of about 25° C. to about 120° C., preferably about 35° C. to about 90° C. and most preferably about 40° C. to about 80° C. In one embodiment the temperature is about 60° C. In one embodiment the temperature is about 65° C. The amphiphilic compound of the invention often remains in the vacuum oven until at least about 50 wt %, preferably at least about 70 wt %, more preferably and least about 90 wt % and even more preferably at least about 98 wt % of solvent and/or moisture are removed. In one embodiment the amphiphilic compound of the invention is dried in the vacuum oven until at least about 99 wt % of solvent and/or moisture is removed. In one embodiment the amphiphilic compound of the invention is substantially free of to free of solvent and/or moisture.

INDUSTRIAL APPLICATION

The amphiphilic compound of the present invention is useful in any applications which require the emulsification or dispersion of other non-polar liquids and/or solids or the ability to wet other surfaces or interfaces oil-in-water surfactants or emulsifiers. The amphiphilic compound may be used in the presence of or in the absence of salt solutions derived from at least one of the group consisting of brine, magnesium chloride, magnesium sulphate, calcium chloride, calcium sulphate and mixtures thereof. Preferably the amphiphilic compound does not require the presence of salt solutions. The applications include emulsions, micro-emulsions, nano-emulsions, invert emulsions, water-in-oil-in-water and oil-in-water-in-oil as well as other combinations.

The amphiphilic compound of the invention can be used in at least one application selected from the group consisting of hydraulic fluids, metal working fluids, cleaning fluids, detergents or personal care products, agriculture such as the emulsification of herbicides or pesticides, a dispersion of solids such as pigments or slurries, a dispersion of paints such as water based paints, coatings, asphalt, transport applications such as in the transport of heavy or crude oil as oil-in-water emulsions, cement, organophilic coatings for clay, general lattices, inks, foam control, pharmaceuticals, foods, leather treatment, textiles, explosives, polishes and emulsion polymerization.

In one embodiment the amphiphilic compound of the invention can be used in personal care products including lotions, creams or solids. These products are coloured or colourless. Examples of suitable personal care items include hair care products (shampoo, conditioner, dyes) or hair styling formulations, for example, gels, foams, mousses, make-up or other skin care products such as lip-stick, lip-gloss, nail varnish, mascara sun block or moisturisers.

In one embodiment the amphiphilic compound of the invention can be used in cleaning fluids for use in industrial or household hard surface cleaning applications. Examples include dishwashing, fabric cleaning, tub and tile cleaning (especially ceramic tiles), floor cleaning and general sink, counter, cabinet, metal and glass cleaning. In one embodiment the amphiphilic compound of the invention can be used for tile cleaning.

In one embodiment the amphiphilic compound of the invention increases or decreases in foaming of an aqueous material, e.g. in clothes washing machines or hand dish-washing applications.

In one embodiment the amphiphilic compound serves to create liquid crystalline or other structures in aqueous or other polar liquids to thereby impart solubilisation abilities and/or rheology modifications and/or color or light refraction modifications.

The following examples provide an illustration of the invention. It should however be noted that these examples are non exhaustive and not intended to limit the scope of the invention.

SPECIFIC EMBODIMENT

EXAMPLES

Example 1

Approximately 276.5 g of polyisobutylene succinic anhydride (about 1000 M.W. polyisobutylene chain) is added into a 1 litre round bottom flask and fitted with a condenser. The flask is heated to about 120° C. and with stirring about 12.8 g of N-Methylglucamine is added. The flask is then heated to about 130° C. and with stirring a second quantity of N-Methylglucamine is added (about 12.8 g). About 10 minutes later a third quantity of N-Methylglucamine is added (about 12.8 g). The sample is held at 130° C. for about 10 minutes then about 46.8 g of propylene glycol is added. The contents of the flask are stirred for about 5 hours at 130° C. until the product is formed. Overall the product contains a mole ratio of 1:1 for polyisobutylene succinic anhydride to N-Methylglucamine.

Example 2

Approximately 251.3 g of polyisobutylene succinic anhydride (about 1000 M.W. polyisobutylene chain) is added into a 1 litre round bottom flask and fitted with a condenser. The flask is heated to about 150° C. and with stirring about 46.4 g of N-Methylglucamine is added. The flask is then heated to about 160° C. and with stirring and a second quantity of N-Methylglucamine is added (about 15.5 g). About 10 minutes later a third quantity of N-Methylglucamine is added (about 15.5 g). The sample is heated to about 165° C. and about 50.0 g of propylene glycol is added followed by another quantity of N-Methylglucamine weighing about 21.6 g. The contents of the flask are stirred for about 7 hours at 165° C. until the product is formed. Overall the product contains a mole ratio of 1:2 for polyisobutylene succinic anhydride to N-Methylglucamine.

Example 3

Approximately 80.8 g of bis(2-aminopropyl)ether-ethylene oxide-propylene oxide copolymer (commercially sold as JEFFAMINE® ED-2003 (or XTJ-502)) is placed in a round bottom flask and heated to about 48° C. A mixture of about 41.5 g of polyisobutylene succinic anhydride (about 1000 M.W. polyisobutylene chain) and about 41.7 g of toluene is added over about 15 minutes to the flask. The reaction is heated to about 65° C. and held for about 20 minutes. The product is placed in a glass dish under vacuum at about 60° C. until dry. The final product is an amber solid and the mole ratio of polyisobutylene succinic anhydride: JEFFAMINE® ED-2003 is about 1:1.

Example 4

Approximately 141.9 g of bis(2-aminopropyl)ether-ethylene oxide-propylene oxide copolymer (commercially sold as JEFFAMINE® ED-2003) is placed in a round bottom flask and heated to about 65° C. A mixture of about 73.7 g of polyisobutylene succinic anhydride (about 1000 M.W. polyisobutylene chain) and about 75.3 g of toluene is added over about 7 minutes to the flask. The flask is then heated to about 65° C. and held for about 5 minutes and about 5.7 g of a 50% sodium hydroxide solution is added. About 28 g of sodium 2-acrylamido-2-methyl propane sulphonate (AMPS®-Na commercially available from The Lubrizol Corporation), is added to the reaction mixture and the temperature is raised to about 110° C. over a period of about 1.5 hours. Water by-product is collected in a Dean-Stark trap. The product is placed in a glass dish under vacuum at about 60° C. until dry. The final product is an amber solid and the mole ratio of polyisobutylene succinic anhydride: JEFFAMINE® ED-2003:sodium hydroxide:AMPS®-Na is about 1:1:1:1.

Example 5

Approximately 145 g of polyethylene glycol 1450 is added to a flask and heated to about 80° C. To the flask about 100 g of polyisobutylene succinic anhydride (about 1000 M.W. polyisobutylene chain) is added over a period of about 30 minutes and held for 3 hours whilst keeping the temperature about 80° C. The reaction mixture is then heated to about 110° C. and held for about 4 hours before cooling to about 80° C. and held for about 3 hours. To the reaction mixture 4 portions of about 10 g of aminopropyl ether-Ethylene oxide-propylene oxide copolymer (commercially available as JEFFAMINE® M-1000 (or XTJ-506)) are added. After the fourth portion of JEFFAMINE® M-1000 is added the mixture is stirred and about 300 g of water is added before cooling to ambient temperature. A clear product is obtained with a mole ratio of 1:1:0.4 of polyisobutylene succinic anhydride (about 1000 M.W. polyisobutylene chain) to polyethylene glycol 1450 to JEFFAMINE® M-1000.

Example 6

Approximately 180 g of polyethylene glycol 600 is added to a flask and heated to about 48° C. To the flask about 0.3 g of sodium acetate is added and the resultant mixture is heated to about 120° C. over a period of about 2 hours while slowly adding about 150 g of polyisobutylene succinic anhydride (about 1000 M.W. polyisobutylene chain). The reaction mixture is held for about 7.5 hours at about 120° C. before a second addition of about 0.7 g of sodium acetate. The reaction mixture is held for about 13 hours more at about 120° C. The reaction mixture is then cooled to about 85° C. and about 330 g of distilled water is added. The product was obtained after stirring on a hot plate for about 30 minutes.

Example 7

The experimental procedure is the same as Example 6, except about 300 g of the product of Example 6 is then poured into a beaker and about 3.6 g of sodium hydroxide in 50% solution is added. The product was obtained after stirring on a hot plate for about 30 minutes.

Test 1—Cleaning Test

Unglazed ceramic tiles are broken into approximately cubic blocks about 10–15 mm in length and coated with a soil composed of a combination of saturated (stearic acid) and unsaturated (oleic/linoleic acids) fats and containing a water soluble dye. The mixture of soil and unglazed ceramic tiles are heated to about 90° C. for about one hour with intermittent mixing about every 20 minutes to ensure a uniform coating. The soiled ceramic is cooled to room temperature with continuous roll mixing and left overnight. Approximately 25 g of soiled unglazed ceramic tiles is weighed into a 75 g glass container along with 25 g of solution containing the amphiphilic compound prepared in examples 1 to 7. The glass contained is shaken at level 3 on a wrist shaker for a period of ten minutes. The samples are weighed before rinsing with distilled water. After rinsing with distilled water the samples are re-weighed and the percentage of soil removed is calculated. This process is carried out for three runs per sample and the results averaged over the 2 results obtained. The average percentage of soil removed for Examples 1 to 7 are:

TABLE 1

Results Obtained for Soil Removal

| Soap Solution Containing the Amphiphilic Compound | Average of 2 Tests % Soil Removed |
|---|---|
| Example 1 | 58.8 |
| Example 2 | 65.5 |
| Example 3 | 50 |
| Example 4 | 58 |
| Example 5 | 64 |
| Example 6 | 65.9 |
| Example 7 | 80.1 |

The test demonstrates that the amphiphilic compound of the invention is capable of cleaning ceramic tiles.

Test 2—Residual Cleaning Ability

This test is carried out using the same methodology as test 1 except, the soil composition uses the distilled water washed off at the end of test 1. The average percentage of soil removed for Examples 1 to 7 are:

TABLE 2

Results Obtained for Soil Removal From Residual Cleaning

| Soap Solution Containing the Amphiphilic Compound | Average of 2 Tests % Soil Removed |
|---|---|
| Example 1 | 42.8 |
| Example 2 | 49.6 |
| Example 3 | 31 |
| Example 4 | 18 |
| Example 5 | 50 |
| Example 6 | 55.4 |
| Example 7 | 70.1 |

Overall, all of the emulsifiers used in examples 1 to 7 demonstrate an ability to clean ceramic tiles. However, the emulsifiers do not have as good residual cleaning ability in Test 2 because, using the water washed off at the end of test 1 contains less emulsifier and therefore this decreases the cleaning ability of the emulsifier.

While the invention has been explained, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An amphiphilic compound comprising:
   (a) a lipophilic component wherein the lipophilic component is a hydrocarbon group containing about 20 or more carbon atoms;
   (b) a hydrophilic component wherein the hydrophilic component is selected from at least one the group consisting of:
      (i) a monomer or an oligomer of an oxyalkylene group containing 2 or more carbon atoms or derivatives thereof;
      (ii) a monomer or an oligomer of an oxyalkylene group containing 3 or more carbon atoms or derivatives thereof;
      (iii) an oligiomer comprising:
         (1) an oxyalkylene group containing 3 or more carbon atoms or derivatives thereof; and
         (2) an oxyalkylene group containing 2 or more carbon atoms or derivatives thereof, provided component (2) is different from component (1);
      (iv) a hydroxyamino group or derivatives thereof;
      (v) a polyhydric alcohol group or derivatives thereof; and
      (vi) a polyamino group or derivatives thereof; and
   (c) a linker covalently bonding the hydrophilic component and the lipophilic component, wherein the hydrophilic component is present in an amount sufficient to at least partially disperse the amphiphilic compound in water, with the proviso that when the hydrophilic component is (b)(i) the monomer or an oligomer of an oxyalkylene group containing 2 or more carbon atoms or derivatives thereof, the linker is a covalent bond directly between the hydrophilic component and the lipophilic component.

2. The amphiphilic compound of claim 1, wherein the lipophilic component is a hydrocarbon group containing about 30 or more carbon atoms.

3. The amphiphulic compound of claim 1, wherein the lipophilic component is a polyolefin.

4. The amphiphilic compound of claim 3, wherein the polyolefin is polyisobutylene or mixtures thereof;.

5. The amphiphilic compound of claim 4, wherein the polyisobutylene average number molecular weight is at least about 250.

6. The amphiphilic compound of claim 1, wherein the amount of the amphiphilic compound partially dispersed in water can be equal to or greater than about 0.01 wt % of the amphiphilic compound dispersed in water at 25° C.

7. The amphiphilic compound of claim 1, wherein the amount of the amphiphilic compound partially dispersed in water can be equal to or greater than about 0.3 wt % of the amphiphilic compound dispersed in water at 25° C.

8. The amphiphilic compound of claim 1, wherein the amphiphilic compound has a HLB of about 8 or more.

9. The amphiphilic compound of claim 1, wherein the hydrophilic component further comprises another polar moiety.

10. The amphiphilic compound of claim 9, wherein the polar moiety is selected from the group consisting of an alcohol, a non-ionic amine, a cationic primary amine, a cationic secondary amine, a cationic tertiary amine, a quaternary amine, an amide, an imide, an alkanolamide, a sarcosinate, a sulphosuccinate, a taurate, a sulphonate, a sulphate, an amine oxide, a poly(oxyalkylene) compound, an ethoxylate, a ketone, a carboxylate, an aldehyde, a glycerol ester, an ester, a 2-acrylomidomethylpropane sulphonic acid, a 2-methacrylomidomethylpropane sulphonic acid, an imidazoline, a phosphate, a phosphonate, a borate, a borane, a silicate, a monoglyceride, a diglyceride, a phosphate ester, a propoxylated acid, a sorbitan, a sucrose ester, a carboxylate salt, a halide, an oxygenated halide, a nitrate, a nitrite, a nitroso compound, a nitramine, a nitro compound, a sulphide, a sulphite, a thiol, an oxygenated sulphur, an azide and mixtures thereof.

11. The amphiphulic compound of claim 10, wherein the polar moiety is selected from the group consisting of 2-acrylomidomethylpropane sulphonic acids, ethoxylates, cationic primary amines, non-ionic amines, bis(2-aminopropyl) ether-Ethylene oxide-propylene oxide copolymers, phosphates, sulphates, sulphonates, carboxylates and mixtures thereof.

12. The amphiphilic compound of claim 1, wherein the linker covalently bonding a hydrophilic component and a lipophilic component is an alpha-beta olefinically unsaturated carboxylic acid or reactive equivalents thereof.

13. The amphiphilic compound of claim 12, wherein alpha-beta olefinically unsaturated carboxylic acid or reactive equivalents thereof is a derivative of a dicarboxylic acid or mixtures thereof.

14. The amphiphilic compound of claim 13, wherein the dicarboxylic acid is maleic anhydride or mixtures thereof.

15. The amphiphilic compound of claim 13, wherein the derivative of a dicarboxylic acid is selected from the group consisting of an imide, an amide, a half amide, an ester, a half ester, a metal salt, a half metal salt and mixtures thereof.

16. A process for preparing an amphiphilic compound comprising reacting:
   (a) a lipophilic reactant present in the range about 6 to about 94 weight percent of the amphiphilic compound; with
   (b) a hydrophilic reactant present in the range about 6 to about 93.9 weight percent of the amphiphilic compound;
   (c) a linker reactant covalently bonding the hydrophilic component and the lipophilic component present in the range about 0.1 to about 30 weight percent of the amphiphilic compound, wherein the lipophilic reactant contains a hydrocarbon group of about 20 or more carbon atoms; the hydrophilic reactant is selected from at least one of the group consisting of (i) a monomer or an oligomer of an oxyalkylene compound containing 2 or more carbon atoms or derivatives thereof; (ii) a monomer or an oligomer of an oxyalkylene compound containing 3 or more carbon atoms or derivatives thereof; (iii) an oligiomer comprising (1) an oxyalkylene compound containing 3 or more carbon atoms or derivatives thereof; and (2) an oxyalkylene group containing 2 or more carbon atoms or derivatives thereof, provided component (2) is different from component (1); (iv) a hydroxyamine or derivatives thereof; (v) a polyhydric alcohol or derivatives thereof; and (vi) a polyamine or derivatives thereof; and wherein the hydrophilic reactant is present in an amount sufficient to at least partially disperse the amphiphilic compound in water, with the proviso that when the hydrophilic component is the monomer or an oligomer of an oxyalkylene group containing 2 or more carbon atoms or derivatives thereof, the linker is a covalent bond directly between the hydrophilic component and the lipophilic component.

17. The process of claim 16 further comprising adding a solvent.

18. The process of claim 16 further comprises drying the amphiphilic compound.

19. The process of claim 16 wherein drying is carried out under vacuum.

20. The process of claim 16, wherein the amount of amphiphilic compound partially dispersed in water is equal to or greater than about 0.01 wt % of the amphiphilic compound dispersed in water at 25° C.

* * * * *